TRANSLATOR CHECKING CIRCUIT FOR TELEPHONE SWITCHING SYSTEM
Filed Dec. 29, 1960
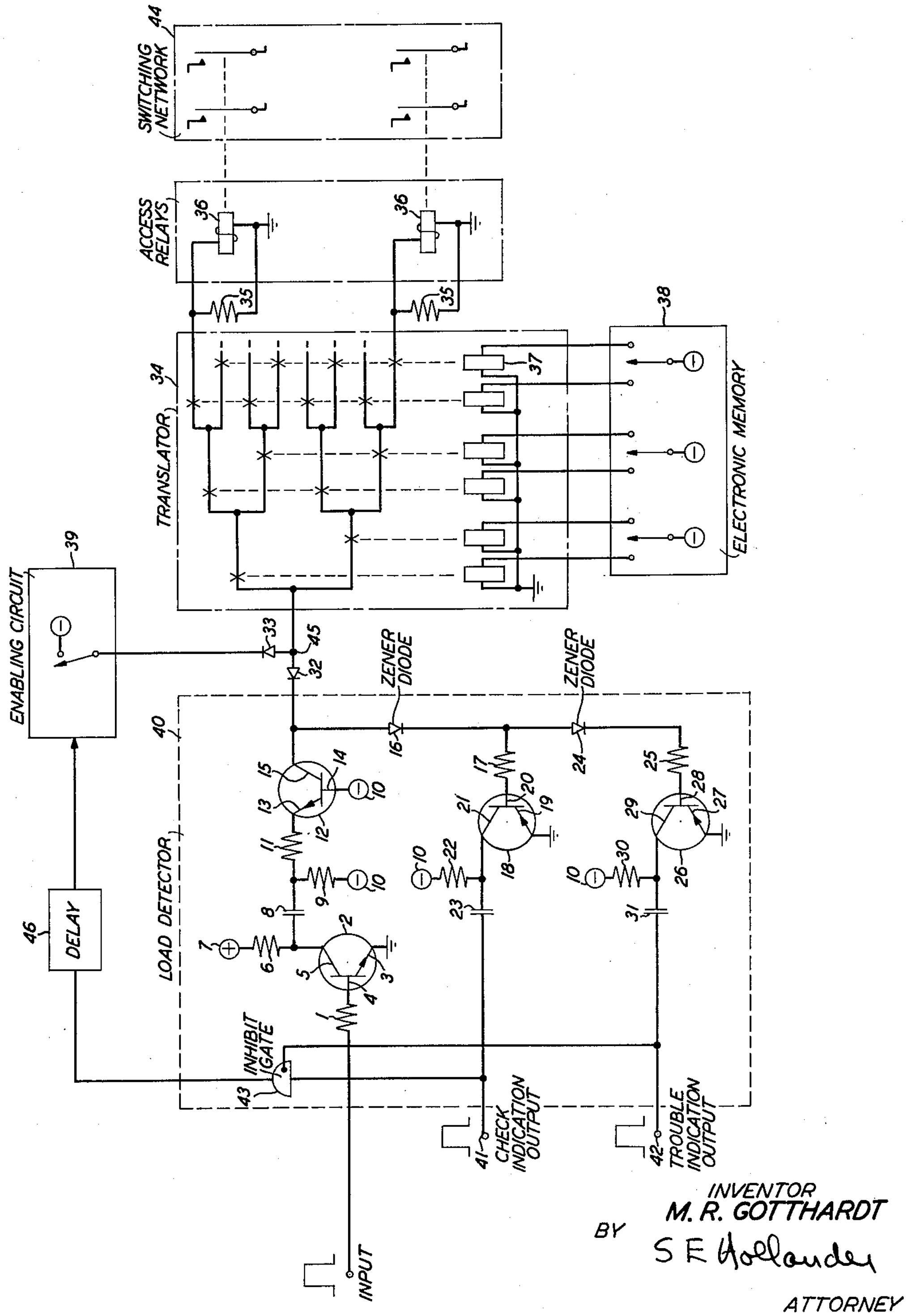
INVENTOR
M. R. GOTTHARDT
BY S E Hollander
ATTORNEY United States Patent Office 3,099,720

Patented July 30, 1963

3,099,720

TRANSLATOR CHECKING CIRCUIT FOR TELEPHONE SWITCHING SYSTEM

Manfred R. Gotthardt, Succasunna, N.J., assignor to Bell Telephone Laboratories, Incorporated, New York, N.Y., a corporation of New York Filed Dec. 29, 1960, Ser. No. 79,312
12 Claims. (Cl. 179—175.2)

This invention relates to translating devices and, more particularly, to circuits for checking the proper operation thereof.

It is often required in modern telephony to complete one of many transmission paths through a switching network in accordance with information stored in an electronic memory. An individual access relay is supplied for each path to be completed. Each of these relays controls the operation of a unique set of contacts in the switching network and upon energization causes a particular path to be completed through the network.

The information stored in the electronic memory is often in binary form and it thus becomes necessary to provide means for operating a particular access relay in accordance with a specific binary number in the memory. A translating device is generally the means whereby this is achieved.

The translator of the present invention is the type of multiterminal ("tree") network in which a common input may be connected to any one of a plurality of output terminals. The input terminal branches out in two directions, the particular branch chosen being determined by which of a first pair of two relays is energized. Each of these branches, in turn, branches out in two directions, the choice of direction again being a function of which of a second pair of relays is energized. In general, with $n$ pairs of translator relays there are $2^n$ unique paths through the translator for connecting a particular one of $2^n$ output terminals to the common input terminal.

The $n$ pairs of translator relays are operated directly from the electronic memory. Each relay may be connected, for example, directly to the plate of one tube of a flip-flop, the relay being energized if this tube is conducting. The electronic memory thus causes a particular output terminal of the translator to be connected to the common input terminal for each binary number stored.

The output terminals of the translator are connected to the access relays which determine the switching network paths. A power source supplies current to the common input terminal to operate a unique access relay in accordance with the path through the translator determined by the translator relays. The access relays complete specific paths through the switching network and thus the transmission path through this network is determined by the binary information stored in the electronic memory.

It is imperative that one, and only one, access relay be operated by the current source at a particular time in order that one, and only one, transmission path through the switching network be completed in accordance with the single binary representation in the memory.

It is seen that open contacts in the translator prevent the operation of the desired access relay. Shorted contacts would result in multiple energizations of the access relays with the corresponding multiplicity of transmission paths being completed through the switching network rather than the single desired path. For this reason it is necessary to check the translator operation, that is, to verify that one, and only one, path has been completed through it.

This checking operation should be performed before the current source is applied to the input terminal so that in the event multiple paths have been completed through the translator the application of the source may be prevented and the completion of the faulty paths in the switching network will be thwarted.

In addition to the checking circuit verifying the proper operation of the translator it is highly desirable to enable the checking circuit to check its own functioning as well. It is of no avail to provide a checking circuit when it provides erroneous information due to its own inefficacy. For this reason it is most advantageous to have the checking circuit provide an indication of its own malfunctioning.

Accordingly, an object of this invention is to provide for the detection of proper operation of a translating device.

It is therefore an object of the invention to provide for the detection of open contacts in a translating device.

Another object of the invention is to provide for the detection of contact shorts in a translating device.

Still another object of this invention is to provide for the detection of a malfunction in the means for detecting the aforesaid malfunctions.

According to my invention, a resistance is placed in parallel with the coil of each access relay. A load detector is connected to the comomn input terminal of the translator device. The load detector supplies a pulse of constant current to the translator. The pulse is of such duration that the coils of the access relays connected to the input terminal through the translating device appear as open circuits. The voltage at the input terminal is thus proportional to the total resistance seen looking into the translator and the resistance is, in turn, inversely proportional to the total number of closed paths through the translator. This voltage is compared to a first reference Zener diode. If only one path has been completed through the translator, the voltage at the input terminal which is the product of the current pulse magnitude and a single load resistance is sufficient to break down the reference Zener diode. When this diode conducts, an output transistor saturates producing a check indication.

In the event of contact shorts resulting in more than one path through the translator, the load resistance is at least halved and the load voltage is less than the threshold of the Zener diode. The absence of the check indication can be interpreted as a contact short.

In case of open contacts in the translator the voltage at the input terminal is greater than that obtained in normal operation. The aforesaid Zener diode breaks down and produces a check indication. In addition, the excess voltage causes the threshold of a second Zener diode to be exceeded and a second output transistor produces a trouble indication. The combination of check and trouble indications can be interpreted as open contacts in the translator.

Internal troubles in the load detector itself result in either a trouble indication or the absence of a check indication. Either one of these two conditions can be interpreted as a malfunction in the load detector itself.

Proper operation of both the load detector and the translator thus results in the presence of a check indication and the absence of a trouble indication. Only if this combination of indications occurs is the particular access relay energized and the switching network path completed.

Thus, a feature of this invention is the provision of means for detecting the proper operation of a translating device.

Another feature of this invention is the provision of means for the detection of contact shorts resulting in the completion of more than one path through said translating device.

A further feature of this invention is the provision of means for the detection of open contacts resulting in the completion of no path through said translating device.

Still another feature of this invention is the provision of means for the detection of a malfunction in the means by which the aforesaid malfunctions are detected.

Further objects, features and advantages of the instant invention will become apparent upon consideration of the following description taken in conjunction with the drawing wherein the FIGURE shows an illustrative embodiment of the invention.

Referring now to the FIGURE, load detector 40 is connected to input terminal 45 of translator 34. The electronic memory 38 operates relay 37 which, in turn, cause the contacts in a particular path in translator 34 to close. The manually-operated switches in electronic memory 38 are merely symbolic and are represented as such for purposes of clarity. The path through translator 34 connects the input terminal 45 to the coil 36 of a particular access relay. The access relays operate the contacts in switching network 44. When load detector 40 receives a check indication in the absence of a trouble indication, the result of one and only one path in the translator being completed, the enabling circuit 39, connected to the common input terminal 45 of translator 34, applies a pulse and energizes the particular access relay chosen.

Subsequent to the energization of relays 37, load detector 40 checks the integrity of the translator contacts by measuring the load resistance seen from the "tail" or the common input terminal 45 of translator 34. A positive input pulse of illustratively 10 microseconds is applied to base 4 of transistor 2. This pulse saturates transistor 2 and the 10 microsecond negative pulse developed at collector 5 is transmitted through capacitor 8 and resistor 11 to emitter 13 of transistor 12. Both emitter 13 and base 14 are connected to the same source 10 providing a zero voltage drop across the emitter-base junction thereby maintaining transistor 12 nonconducting. The negative pulse applied to emitter 13 forward biases the base-emitter junction and causes transistor 12 to conduct.

It is necessary for proper operation of load detector 40 that the current pulse supplied by transistor 12 be constant in magnitude, independent of the load impedance connected to collector 15. To obtain a constant magnitude current pulse, transistor 12 is operated in the common base configuration. In this configuration for a constant emitter current the collector current is approximately constant for all values of load resistance. The characteristics of a transistor in the common base configuration resemble those of a pentode vacuum tube. The horizontal axis is a plot of collector-base voltage with the vertical axis representing the collector current. The characteristics themselves represent various values of emitter current and after an initial rise these characteristics are essentially flat. The load connected to the collector of a transistor in the common base configuration determines the slope of the load line on the characteristics. Due to the shape of the flat portion of the characteristics, it is seen that for a constant emitter current the intersection of the load line with any part of the flat portion of an emitter current characteristic results in the same collector current independent of the magnitude of the load resistance.

In the following description the parameters of the circuit may advantageously take the following illustrative values.

| Parameter: | Value |
|---|---|
| Source 10 ........ volts | −40 |
| Emitter-base junction voltages of transistors 18 and 26 when forward biased ........ volts | .2 |
| Resistor 17 | 4K |
| Resistors 35 | 10K |
| Breakdown voltage of Zener diode 16 ........ volts | 26 |
| Breakdown voltage of Zener diode 24 ........ do | 6 |
| Voltage drop across diode 32 in forward direction ........ volts | .5 |

If capacitor 8 is sufficiently large, the negative pulse developed at collector 5 is maintained across the parallel combination of resistor 9 and transistor 12 in series with resistor 11 for its 10 microsecond duration. This results in a constant current in the loop comprising resistors 9 and 11 and the emitter-base junction of transistor 12. This constant emitter current results in a constant collector 15 current which because of the transistor configuration is independent of the load impedance.

With the particular transistor used in this embodiment, the collector current of transistor 12 is four milliamperes. This current is drawn from ground through the resistor 35 connected across the particular access relay chosen, through translator 34 and diode 32 and into collector 15. If more than one path is completed, current is drawn through the corresponding resistors and paths. However, it is essential to this invention that the total current drawn into collector 15 be constant (four milliamperes) independent of the number of paths completed through the translator. This will, in fact, be the case since transistor 12 in the common base configuration acts as a constant current source independent of its load.

Diode 33 isolates the enabling circuit 39 from load detector 40 for the duration of the 10 microsecond pulse because it is poled in a direction to prevent duration flow from enabling circuit 39 to collector 15 of transistor 12.

It will be convenient to describe the operation of the circuit for each translator condition; namely, proper operation, contact shorts and open contacts. The fourth mode of operation of load detector 40 takes place when internal malfunctions in the detector itself occur.

*Proper Operation of Translator 34 (A Single Path Completed)*

Zener diode 16 has a breakdown voltage of 26 volts. Zener diodes behave as ordinary diodes when a positive voltage is applied across the m in such direction as to forward bias the P-N junction. When a reverse voltage is applied across these two-terminal devices, the devices aagin exhibit the characteristics of ordinary semiconductor diodes. Small reverse currents flow. However, when the reverse voltage exceeds the breakdown voltage, the diodes "breakdown." A constant voltage equal to the breakdown voltage is maintained across the diodes independent of the reverse current flowing through them.

The cathode of Zener diode 16 is connected through resistor 17 and the base-emitter junction of transistor 18 to ground. Thus, this diode will break down if a negative pulse with a magnitude greater or equal to 26 volts is applied to its anode.

The particular coil 36 connected to terminal 45 through translator 34 does not affect the magnitude of the current drawn through the respective resistor 35. The coils present an impedance much greater than the 10K impedance of resistors 35 to the 10 microsecond pulses and hence may be treaded as infinite impedance during the operation of the load detector.

When Zener diode 16 breaks down, current is drawn through this diode to collector 15. The total current into collector 15 must remain four milliamperes. Thus, a current smaller in magnitude than four milliamperes flows through resistor 35. The exact values of resistor 35 and Zener diode 16 currents determine the voltage of collector 15. This voltage less the 26 volt drop across Zener diode 16 is the voltage at the junction of resistor 17 and Zener diode 24. A determination of the junction voltage reveals that Zener diode 24 does not break down.

Since Zener diode 24 does not break down, the current flowing up through Zener diode 16 into collector 15 must come entirely through resistor 17. Let this current be $I_z$. The voltage across the emitter-base junction of transistor 18 is .2 volt when biased in the forward direction. Resistor 17 has a value of 4K. The collector 15 voltage is the sum of the three voltage drops due to the forward bias of the emitter-base junction, and the voltage drops across resistor 17 and Zener diode 16. Thus, the magnitude of the negative voltage at collector 15 is $$(.2+4I_z+26)$$

volts where $I_z$ is in milliamperes. This voltage must also equal the voltage drop across resistor 35 and diode 32. If $I_r$ is the milliampere current through resistor 35, the voltage magnitude at collector 15 must also equal $(10I_r+.5)$. The voltage at collector 15 must be the same for the two paths along which the above voltage drops have taken. The equality of the above two expressions results in one equation with two unknowns, $I_r$ and $I_z$. A second equation results from the fact that $(I_r+I_z)$ must equal the collector current which is a constant four milliamperes. The solution of these two simultaneous equations results in a value of load current of 2.98 milliamperes. The current through Zener diode 16 is thus 1.02 milliamperes. Either of the above expressions for the collector 15 voltage gives a value of 30.3 volts. Thus the junction of resistor 17 and the two Zener diodes is at a voltage level of 30.3−26 or 4.3 volts. This voltage is less than 6 volts and does not cause Zener diode 24 to break down.

Both transistors 18 and 26 are normally nonconducting due to the zero voltage bias across their base-emitter junctions. Zener diode 24 does not break down, no curent is drawn from the base electrode 28 of transistor 26 and this transistor remains nonconducting. The current drawn through Zener diode 16, however, forward biases the base-emitter junction of transistor 18. In the nonconducting quiescent condition, collector 21 is at the negative potential of source 10. The 10 microsecond pulse of current causes collector current to flow through resistor 22 to source 10. This produces a 10 microsecond positive pulse at collector 21 which is transmitted through capacitor 23 to terminal 41.

Thus, proper operation of translator 34, i.e., the completion of only one path and the connection of only one access relay input terminal 45 results in a positive pulse from transistor 18 and the absence of a pulse from transistor 26. This pulse from transistor 18, the check indication, then triggers the enabling circuit 39. This triggering is to occur only upon both the appearance of the check indication and the absence of a pulse from transistor 26. Inhibit gate 43 controlls this operation. An output pulse is obtained from inhibit gate 43 upon the appearance of an input pulse on the check indication lead only if the gate terminal is not energized. The output pulse triggers enabling circuit 39. This circuit can be one of many well-known circuits in the art and for purposes of clarity is shown symbolically as a manually operated switch. The enabling circuit 39 then draws current through the selected access relay in the poled direction of diode 33 thereby closing the particular contacts in the switching network. During this energization of the access relay by enabling circuit 39, load detector 40 is isolated from the circuit by diode 32 which is poled in a direction to prevent current flow from load detector 40 into enabling circuit 39.

Delay 46 introduces a 20 microsecond delay between the application of the output pulse from inhibit gate 43 and the triggering of enabling circuit 39. This is to prevent enabling circuit 39 from operating during the operation of load detector 40. Without this time separation of functions, enabling circuit 39 would draw all current through transistor 34 and the entire collector 15 current of four milliamperes would flow through Zener diode 16. This is the condition obtained for an open contact in the translator 34. The inclusion of delay 46 postpones the triggering of enabling circuit 39 until the load detector interrogation is completed.

*Shorted Contacts*

In the event that two or more paths have been completed through translator 34, the input resistance seen by the 10 microsecond, four milliampere current pulse is equal to or less than 5K. Thus, the voltage at the collector terminal 15 of transistor 12 is equal to or less than 4(5)+.5 or 20.5 volts. This voltage is less than the breakdown voltage of Zener diode 16 which remains nonconducting. Thus, the junction of resistor 17 and the two Zener diodes 16 and 24 remains at zero volts and Zener diode 24 similarly does not break down. Consequently, neither transistor 18 nor transistor 26 is forward biased and neither output pulse occurs. The absence of both output pulses can be interpreted as a contact short in translator 34. The inhibit gate 43 does not trigger the enabling circuit 39 due to the absence of the check indication. No access relay is enabled until the contact failure in the translator is corrected.

*Open Contacts*

In the event that no path is completed through translator 34 no current can be drawn through resistors 35 to collector 15. The equivalent collector-base circuit of transistor 12 consists of the 40-volt source 10 in series with Zener diode 16 and the parallel combination of transistor 18 and Zener diode 24 in series with transistor 26. Due to the fact that transistor 12 acts as a constant current source, four milliamperes flow through Zener diode 16. Zener diode 24 breaks down as well and part of the four milliampere current is derived from base 28 of transistor 26. Both transistors 18 and 26 are forward biased for the 10 microsecond pulse duration and a positive pulse is produced at both collectors 21 and 29. These pulses are transmitted to inhibit gate 43 through capacitors 23 and 31, respectively. The appearance of both pulses can be interpreted as indicative of open contacts in translator 34. As in the case of shorted contacts enabling circuit 39 is not triggered and no access relay is energized.

*Internal Trouble*

There are four combinations of conduction states of Zener diodes 16 and 24. The breakdown of Zener diode 16 and the nonconduction of Zener diode 24 has been interpreted as a check indication. The nonconduction of both Zener diodes 16 and 24 can be interpreted as contact shorts. The conduction of both Zener diodes 16 and 24 can indicate open contacts. The fourth possibility, the breakdown of Zener diode 24 and the nonconduction of Zener diode 16, cannot occur if the load detector is functioning properly for if Zener diode 16 does not break down, there is no potential difference across Zener diode 24.

Various disorders in load detector 40 result in indications as follows:

(1) If transistor 2 shorts or opens no pulse is transmitted through capacitor 8. Thus, neither transistor 18 nor transistor 26 produces an output pulse. This is the same condition as that obtained for contact shorts in translator 34.

(2) If transistor 12 shorts or opens, the input pulse is again not transmitted to resistor 35. No output pulses result and enabling circuit 39 is not triggered as in the case of contact shorts.

(3) If Zener diode 16 opens no current can be drawn therethrough. This results in the same indications as cases 1 and 2.

(4) If Zener diode 24 shorts, transistor 26 will always conduct with transistor 18. The appearance of both output pulses is the same indication as that obtained for open contacts and enabling circuit 39 is not triggered.

(5) If Zener diode 16 shorts, the collector 15 voltage causes Zener diode 24 to break down. This results in a pulse from both transistors 18 and 26. This is the same output as that obtained for open contacts.

(6) If transistor 18 shorts or opens, the check indication is not obtained and enabling circuit 39 is inhibited from operating.

In each of the above malfunctions of load detector 40, enabling circuit 39 is not triggered and no incorrect paths are completed through switching network 44. Terminals 41 and 42 are accessible to help localize the failure by determining whether inhibit gate 43 failed to trigger enabling circuit 39 due to the absence of the check indication or the presence of the trouble indication.

A test may also be provided to check whether or not Zener diode 24 has opened. With no information in electronic memory 38 there are no paths completed through translator 34. An input pulse should now cause both Zener diodes to break down since in effect an open contact condition is achieved. If a trouble indication does not appear on terminal 42 it is an indication that Zener diode 24 has opened. This test may be applied cyclically by inserting no information into electronic memory 38, applying an input pulse and observing the output on terminal 42.

Thus, if one and only one path is completed through translator 34 a pulse from transistor 18 alone is obtained. This is the only condition under which enabling circuit 39 is triggered so as to energize the particular access relay chosen. All other output combinations have various interpretations and reveal malfunctions in either load detector 40 or translator 34.

It is to be understood that the above-described arrangement is but illustrative of the application of the principles of the invention. Numerous other arrangements may be devised by those skilled in the art without departing from the spirit and scope of the invention. If, for example, as is often the case, it is desired to operate two access relays the above-described embodiment of the invention need be changed merely by replacing the 10K load resistors by 20K resistors. Adequate collector 15 voltage is then obtained to produce only a check indication when two and only two paths are completed through translator 34.

What is claimed is:

1. A checking circuit for a translator having a common input terminal and a plurality of output terminals with only one of said output terminals connected to said input terminal upon proper operation of said translator comprising load resistance means connected to each of said output terminals, constant current means connected to said input terminal for developing a voltage at said input terminal inversely proportional to the number of said resistance means connected to said input terminal through said translator, first alerting means connected to said input terminal and responsive to said developed voltage at said input terminal exceeding a first predetermined value for indicating the connection of at most one of said output terminals to said input terminal, and second alerting means connected to said input terminal and responsive to said voltage exceeding a second predetermined value for indicating the connection of none of said output terminals to said input terminal.

2. A checking circuit in accordance with claim 1 wherein said first and second alerting means include means for indicating malfunctions in said constant current means and in said first and second alerting means.

3. A checking circuit for a translator having a common input terminal and a plurality of output terminals with only one of said output terminals connected to said input terminal upon proper operation of said translator comprising load resistance means connected to each of said output terminals, constant current means connected to said input terminal for developing a voltage at said input terminal which is proportional to the number of said resistance means connected to said input terminal through said translator, first alerting means including first Zener diode voltage reference means connected to said input terminal responsive to said developed voltage at said input terminal exceeding the reference voltage of said first Zener diode means for indicating the connection of at most one of said output terminals to said input terminal, and second alerting means including second Zener diode voltage reference means connected to said first alerting means and responsive to said input terminal voltage exceeding the sum of said first and second reference voltages of said first and second Zener diode means for indicating the connection of none of said output terminals to said input terminal.

4. A combination in accordance with claim 3 including inhibiting means for producing an output pulse only upon the operation of said first alerting means and in the absence of the operation of said second alerting means, an energizing source connected to said common input terminal for energizing said output terminals in response to said output pulse from said inhibiting means, and means for isolating said constant current means and said energizing source from each other.

5. A checking circuit for determining whether the input resistance between a source of reference potential and a terminal is between first and second predetermined values comprising a source of constant current connected to said terminal, a first transistor device having first emitter, base and collector electrodes, said first emitter connected to said reference potential, biasing means for maintaining said first transistor device nonconductive, first resistance means connected to said first base, first Zener diode reference voltage means connected between said first resistance means and said terminal having a breakdown voltage approximately equal to the product of said current and said first predetermined value, a second transistor device having second emitter, base and collector electrodes, said second emitter connected to said reference potential, second biasing means connected to said second collector for maintaining said second transistor device nonconductive, and second Zener diode reference voltage means connected between said second base and the junction of said first Zener diode means and said first resistance means and poled in the same direction as said first Zener diode means for controlling the conduction of said second transistor device responsive to the voltage on said terminal exceeding said second predetermined value.

6. A combination in accordance with claim 5 including in addition a tree translating device connected to said input terminal and wherein said input resistance is proportional to the number of paths completed through said translating device.

7. In combination, a source of reference potential, a translating device having an input terminal and a plurality of output terminals, impedance means connected between each of said output terminals and said reference potential, current means connected between said reference potential and said input terminal for applying a predetermined constant current to said input terminal of said translating device, and voltage breakdown means connected between said input terminal and said source of reference potential for controlling part of said predetermined constant current to be diverted to said voltage breakdown means responsive to predetermined numbers of said impedance means being connected to said input terminal through said translating device.

8. A circuit for checking whether the input resistance between a reference potential and a terminal lies within first and second predetermined values comprising current source means connected between said reference potential and said terminal for controlling a current flow from said source through said resistance to said reference potential, first Zener diode means connected to said terminal and poled to conduct current in the breakdown condition in the same direction as current flow from said source responsive to said resistance exceeding said first predetermined value, switching means connected between said reference potential and said first Zener diode means for conducting current responsive to the breakdown of said first Zener diode means, and second Zener diode means connected across said switching means and poled to permit current flow in the same direction as said first Zener diode means, said switching means including means for causing said second Zener diode means to conduct current in the breakdown condition responsive to said resistance exceeding said second predetermined value.

9. In combination, a translating device having a common input terminal and a plurality of output terminals, multicontact switching circuit means, an energizing source connected to said common input terminal for applying current to said translating device, relay means connected to said output terminals for controlling said multicontact switching circuit means responsive to the application of said current, memory means for controlling the connection of said output terminals to said common input terminal through said translating device, and a check network for verifying that a single one of said output terminals is connected to said common input terminal, said check network including constant current means connected to said common input terminal for applying a constant current to said translating device, first Zener diode reference voltage means connected to said common input terminal for conducting in the reverse direction responsive to at most one of said output terminals being connected to said common input terminal, a parallel combination of amplifying means and second Zener diode reference voltage means connected to said first Zener diode means, said second Zener diode means conducting in the reverse direction responsive to none of said output terminals being connected to said common input terminal, switching means for operating said energizing means responsive to the breakdown of said first Zener diode means in the absence of the breakdown of said second Zener diode means, and means for isolating said constant current means and said energizing means from each other.

10. In a telephone system, a translating device having a common input terminal and a plurality of output terminals, memory means, multicontact switching circuit means for completing a path through said switching circuit means in accordance with information stored in said memory means, relay means connected to said output terminals for operating said multicontact switching circuit means, said translating device including means for connecting a particular one of said output terminals to said common input terminal in accordance with said information stored in said memory means, an energizing source connected to said common input terminal for energizing said relay means, and a check network, said check network including constant current means connected to said common input terminal, a series connection including first and second Zener diode means connected to said common input terminal, a series connection including resistance means and first amplifying means connected to the junction of said first and second Zener diode means and responsive to the reverse conduction of said first Zener diode means for indicating the connection of at most one of said output terminals to said common input terminal, second amplifying means connected to the other side of said second Zener diode means responsive to the reverse conduction of said second Zener diode means for indicating the connection of none of said output terminals to said input terminal, and means connected to said first and second amplifying means for controlling said energizing means responsive only to the connection of a single output terminal to said common input terminal.

11. In a telephone system, a translating device having a plurality of output terminals and a common input terminal, multicontact switching circuit means for completing transmission paths through said telephone system, energizing means connected to said input terminal, a reference potential, relay means connected between said reference potential and said output terminals for actuating said switching network and operative in response to said energizing means, means for connecting said output terminals to said input terminal in accordance with information stored in said telephone system relating to said transmission paths to be completed, a first Zener diode connected to said input terminal, a first transistor device having first base, emitter and collector electrodes, first resistance means connected between said first base and said first Zener diode, first biasing means for maintaining said first transistor device nonconductive, a second Zener diode connected to the junction of said first resistance means and said first Zener diode, a second transistor device having second emitter, base and collector electrodes, said second base connected to said second Zener diode, second biasing means connected to said second emitter and collector electrodes for maintaining said second transistor device nonconductive, second resistance means connected to said output terminals, constant current means connected between said reference potential and said input terminal and poled to conduct current in the reverse direction of both of said first and second Zener diodes for producing a voltage at said input terminal proportional to the number of said second resistance means connected to said input terminal through said translating device to break down said first Zener diode if said voltage exceeds a first predetermined value and to break down said first and second Zener diodes if said voltage exceeds a second predetermined value, and means including said first and second transistor devices for actuating said energizing means responsive to the breakdown of only said first Zener diode.

12. A translating device having a common input terminal and a plurality of output terminals with only one of said output terminals connected to said input terminal upon proper operation of said translating device comprising an energizing source connected to said common input terminal and a check network for controlling said energizing source, said check network including constant current means for applying a constant current to said common input terminal, first switching means, first Zener diode means connected between said common input terminal and said first switching means for conducting in the breakdown condition and for controlling said first switching means to trigger said energizing source responsive to the voltage at said common input terminal exceeding a first predetermined value, second Zener diode means connected at one end to the junction of said first Zener diode means and said first switching means, second switching means connected to the other end of said second Zener diode means for producing an output pulse responsive to the breakdown of said second Zener diode means, said first switching means including means for causing the breakdown of said second Zener diode means when the voltage at said input terminal exceeds a second predetermined value, and inhibiting means for inhibiting the triggering of said energizing means upon the occurrence of said output pulse from said second switching means.

References Cited in the file of this patent

UNITED STATES PATENTS

| | | |
|---|---|---|
| 2,751,549 | Chase | June 19, 1956 |
| 2,832,900 | Ford | Apr. 29, 1958 |
| 2,866,106 | Shuck | Dec. 23, 1958 |
| 2,888,527 | Follensbee | May 26, 1959 |
| 2,906,941 | Brolin | Sept. 29, 1959 |
| 2,954,483 | Ulrich | Sept. 27, 1960 |
| 2,965,767 | Wanlass | Dec. 20, 1960 |
| 2,986,677 | Hechler | May 30, 1961 |

OTHER REFERENCES

Article: Use Power Zener Diodes for Protection, Learned; from Application Notes Motorola Semi-Conductor Products Inc., 1-1961 (reprinted from Electronic Equipment Engineering).